(12) United States Patent
Goldring et al.

(10) Patent No.: US 11,085,465 B2
(45) Date of Patent: Aug. 10, 2021

(54) RETENTION SYSTEMS FOR LIGHT WEIGHT ACTUATOR GLANDS

(71) Applicant: GOODRICH CORPORATION, Charlotte, NC (US)

(72) Inventors: Eric Goldring, Oakville (CA); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 291 days.

(21) Appl. No.: 16/298,928

(22) Filed: Mar. 11, 2019

(65) Prior Publication Data

US 2020/0291969 A1 Sep. 17, 2020

(51) Int. Cl.
*B64C 25/62* (2006.01)
*F15B 15/14* (2006.01)

(52) U.S. Cl.
CPC .......... *F15B 15/1447* (2013.01); *B64C 25/62* (2013.01)

(58) Field of Classification Search
None
See application file for complete search history.

(56) References Cited

U.S. PATENT DOCUMENTS

| 3,379,332 | A | | 4/1968 | Anderson | |
|---|---|---|---|---|---|
| 4,608,912 | A | | 9/1986 | Navarette | |
| 4,746,086 | A | * | 5/1988 | Happ | B64C 25/001 244/104 R |
| 6,783,107 | B2 | | 8/2004 | Chatufale | |
| 9,989,075 | B2 | * | 6/2018 | Bueter | F15B 15/1438 |
| 2009/0218444 | A1 | * | 9/2009 | Lahargou | B64C 25/60 244/102 SL |
| 2015/0040554 | A1 | | 2/2015 | Smith et al. | |
| 2018/0186446 | A1 | * | 7/2018 | Schmidt | B64D 29/08 |
| 2019/0145144 | A1 | * | 5/2019 | Pandian | B64D 29/08 244/129.4 |

FOREIGN PATENT DOCUMENTS

| CH | 643638 | 6/1984 |
|---|---|---|
| EP | 3076048 | 10/2016 |

OTHER PUBLICATIONS

European Patent Office, European Search Report dated Jun. 8, 2020 in Application No. 19213593.7.

\* cited by examiner

*Primary Examiner* — Richard G Davis
(74) *Attorney, Agent, or Firm* — Snell & Wilmer L.L.P.

(57) ABSTRACT

Retention systems for retaining a gland is provided. A hydraulic actuator may comprise a cylinder closed at an end by a gland, wherein the gland comprises a gland body having a bearing flange disposed within an interior volume of the cylinder, a lock ring retainer disposed between the gland body and the cylinder and contacted with the bearing flange, and a lock ring coupled between the lock ring retainer and a lock ring channel of the cylinder.

18 Claims, 6 Drawing Sheets

RETENTION SYSTEMS FOR LIGHT WEIGHT ACTUATOR GLANDS

FIELD

The present disclosure relates to aircraft retractable landing gear systems, and, more specifically, to hydraulic cylinders and actuator glands.

BACKGROUND

Landing gear supports an aircraft while the aircraft is on the ground. Landing gear may include one or more wheels and a shock strut assembly in order to attenuate the forces associated with landing or ground operations. A shock strut assembly may be extended or retracted into a landing gear bay. A landing gear shock strut assembly may comprise one or more hydraulic actuators to power the extension or retraction. Hydraulic actuators typically comprise cylinders, glands, endcaps, and related components of metallic materials such as steels which may benefit of weight reduction. Actuator components such as a gland or an endcap may traditionally be retained by a threaded coupling to the actuator cylinder or by a threaded fastener. However, in contrast to steels, relatively light weight materials tend to have comparatively poor shear performance generally unsuitable for traditional retention means.

SUMMARY

In various embodiments, a hydraulic actuator is provided. A hydraulic actuator may comprise a cylinder closed at an end by a gland, wherein the gland comprises a gland body having a bearing flange disposed within an interior volume of the cylinder, a lock ring retainer disposed between the gland body and the cylinder and contacted with the bearing flange, and a lock ring coupled between the lock ring retainer and a lock ring channel of the cylinder.

In various embodiments, the actuator further comprises a piston disposed within the interior volume of the cylinder and coupled to a piston rod wherein the gland body comprise an annular cylindrical structure, wherein the piston rod extends from a piston end of the gland body through an annulus of the gland body out a rod end of the gland body. In various embodiments, the piston rod is supported by a piston bearing fitted into the annulus of the gland body. In various embodiments, the gland body comprises one of aluminum, aluminum alloy, titanium, titanium alloy, lithium alloy, magnesium alloy, composite material, or plastic. In various embodiments, the cylinder comprises composite material. In various embodiments, a spacer is disposed between the gland body and the cylinder and contacted with the lock ring. In various embodiments, the gland body further comprises a supply port, wherein the spacer is fixed from translating axially with respect to the gland body by an interference between the spacer and the supply port or between the spacer and a supply port fitting disposed within the supply port. In various embodiments, the lock ring retainer comprises one of nickel, nickel alloy, bronze, bronze alloy, aluminum, aluminum alloy, aluminum-nickel-bronze alloy, or bearing metal. In various embodiments, each of the lock ring, the lock ring retainer, and the spacer comprise two or more arcuate segments.

In various embodiments, a landing gear system is provided comprising a shock strut coupled to an axle, a wheel coupled to the axle, and a hydraulic actuator coupled to the shock strut comprising a cylinder closed at an end by a gland, wherein the gland comprises a gland body having a bearing flange disposed within an interior volume of the cylinder, a lock ring retainer disposed between the gland body and the cylinder and contacted with the bearing flange, and a lock ring coupled between the lock ring retainer and a lock ring channel of the cylinder.

In various embodiments, the actuator further comprises a piston disposed within the interior volume of the cylinder and coupled to a piston rod wherein the gland body comprise an annular cylindrical structure, wherein the piston rod extends from a piston end of the gland body through an annulus of the gland body out a rod end of the gland body. In various embodiments, the piston rod is supported by a piston bearing fitted into the annulus of the gland body. In various embodiments, the gland body comprises one of aluminum, aluminum alloy, titanium, titanium alloy, lithium alloy, magnesium alloy, composite material, or plastic. In various embodiments, the cylinder comprises composite material. In various embodiments, a spacer is disposed between the gland body and the cylinder and contacted with the lock ring. In various embodiments, the gland body further comprises a supply port, wherein the spacer is fixed from translating axially with respect to the gland body by an interference between the spacer and the supply port or between the spacer and a supply port fitting disposed within the supply port. In various embodiments, the lock ring retainer comprises one of nickel, nickel alloy, bronze, bronze alloy, aluminum, aluminum alloy, aluminum-nickel-bronze alloy, or bearing metal. In various embodiments, each of the lock ring, the lock ring retainer, and the spacer comprise two or more arcuate segments.

In various embodiments, a method of retaining a gland comprises inserting a piston end of a gland body of the gland into a cylinder and further inserting a bearing flange of the gland body beyond a lock ring channel of the cylinder, inserting a lock ring retainer between the gland body and the cylinder and beyond the lock ring channel into contact with the bearing flange, inserting a lock ring between the gland body and the cylinder and beyond the lock ring channel to contact the lock ring retainer, and partially withdrawing the piston end of the gland from the cylinder and, in response, seating the lock ring in the lock ring channel. The method may include inserting a spacer between the gland body and the cylinder into contact with the lock ring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
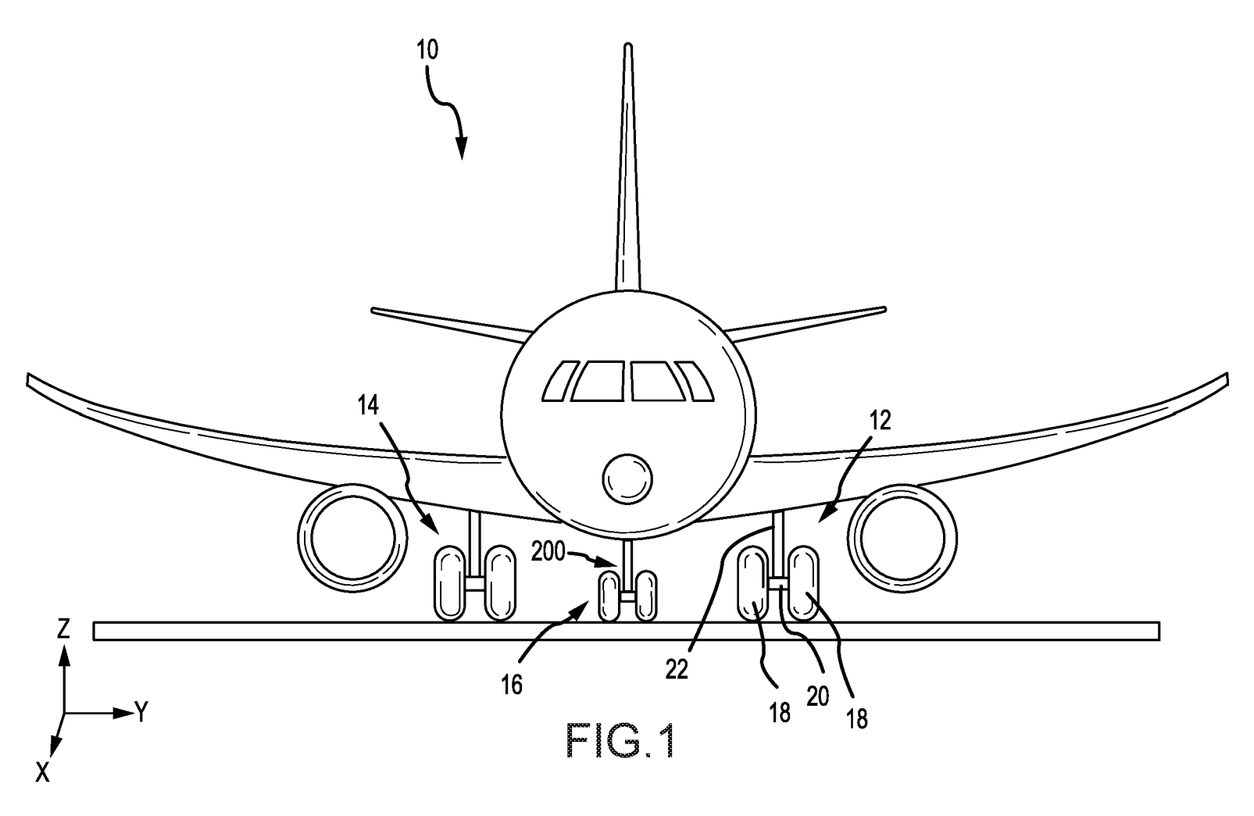
FIG. 1 illustrates an aircraft, in accordance with various embodiments.

With reference to FIG. 1, an aircraft 10 in accordance with various embodiments may comprise aircraft systems, for example, one or more landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut assembly 22 comprising a hydraulic actuator.

Figure 2:
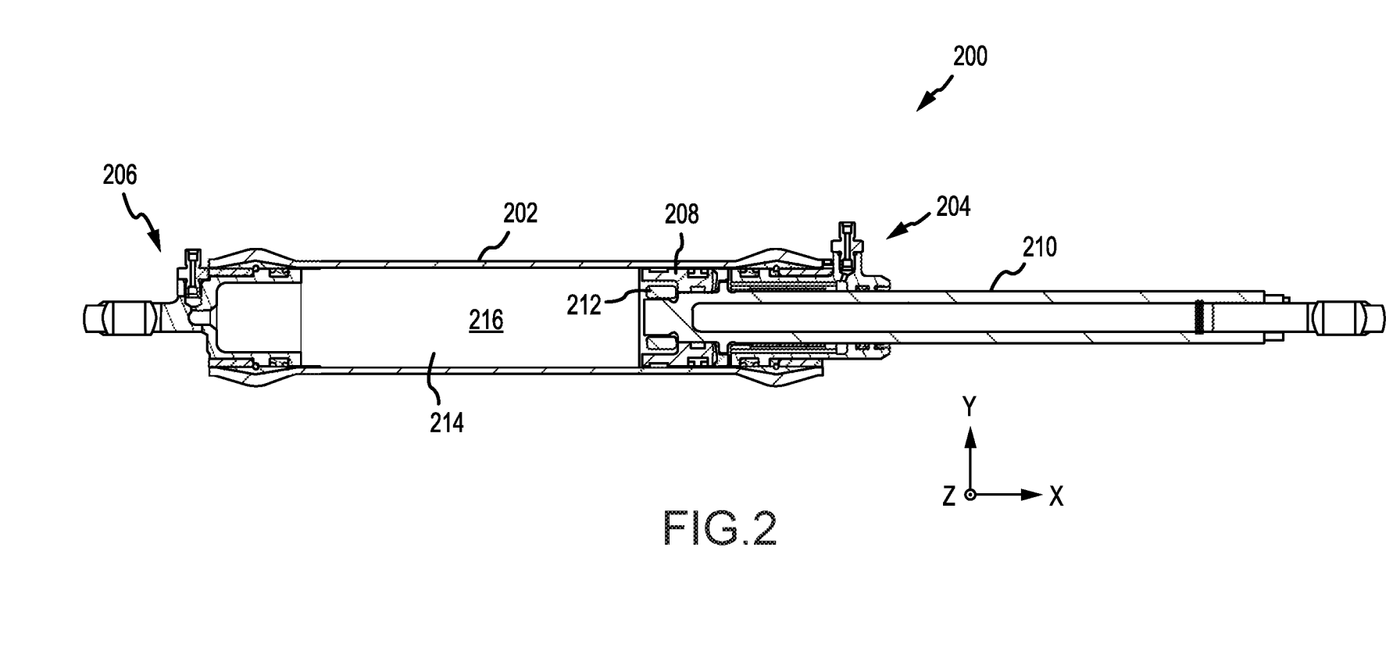
FIG. 2 illustrates an actuator, in accordance with various embodiments.

In various embodiments and with additional reference to FIG. 2, shock strut assembly 22 may include an actuator 200 having retention systems for a gland. FIG. 2A illustrates actuator 200 in planar cross section of the XY-plane. Actuator 200 comprises a cylinder 202 closed at a rod head end by a gland 204 and at a base end by an endcap 206. A piston 208 is disposed within the interior volume 216 of the cylinder 202. The piston 208 is coupled to a piston rod 210 by piston rod nut 212. The piston rod 210 extends axially through the gland 204. In various embodiments, cylinder 202 may comprise a composite material and a cylinder sleeve 214 may be coupled at an interior circumference of the cylinder 202. In response to hydraulic action, the piston 208 may traverse axially (along the X-axis) within the cylinder 202 and drive piston rod 210 to extend or retract from the piston rod end. In various embodiments, the cylinder 202 may comprise a composite material and the cylinder sleeve 214 may comprise a metallic material in contact with the piston 208. In this regard, the cylinder sleeve 214 may tend to inhibit cylinder wear in response to the traverse of the piston 208.

Figure 3A:
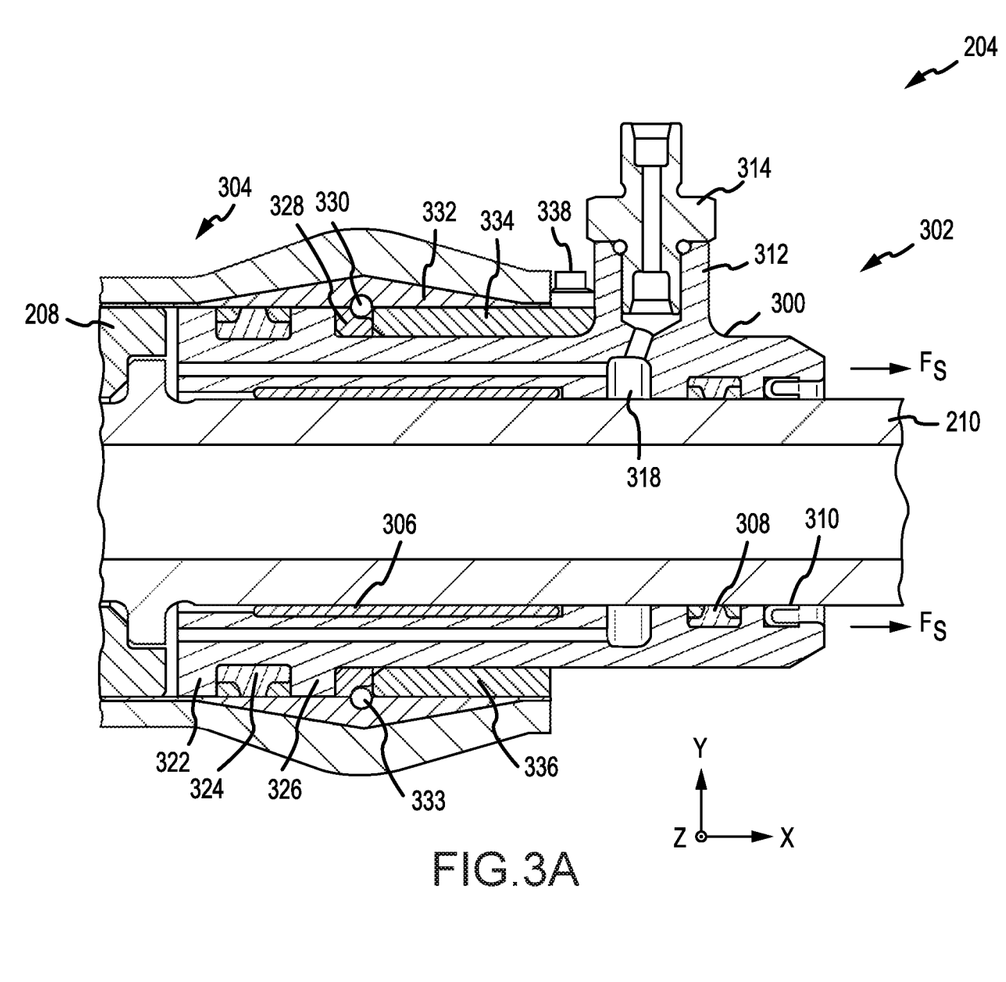
FIG. 3A illustrates a gland of an actuator, in accordance with various embodiments.
Figure 3B:
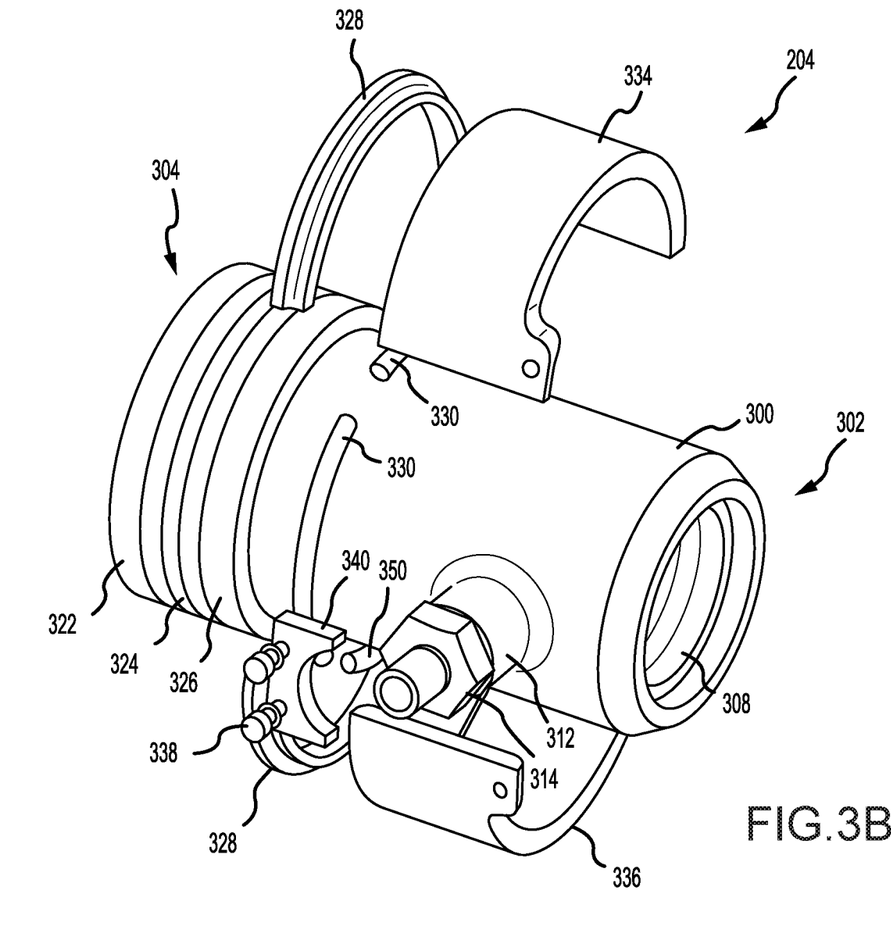
FIG. 3B illustrates a gland of an actuator, in accordance with various embodiments.

With additional reference to FIGS. 3A and 3B, piston rod end of the actuator 200 is shown illustrating details of the gland 204. Gland 204 comprises a gland body 300 which has a generally annular cylindrical structure extending axially from rod end 302 to piston end 304. In various embodiments, the gland body 300 may comprise one of an aluminum, an aluminum alloy, a titanium, a titanium alloy, a lithium alloy, a magnesium alloy, a composite, and/or a plastic. The piston end 304 is inserted into cylinder 202 and cylinder sleeve 214 with the piston rod 210 extending though the annulus of the gland body 300 out through the rod end 302. The piston rod 210 is supported by a piston bearing 306 (i.e., a first bearing) which is fitted proximate the piston end 304 into the gland body 300 at the inner diameter of the gland body annulus. In various embodiments the piston bearing 306 may comprise a first bearing material such as, for example, one of a nickel, a bronze, a nickel alloy, a bronze, alloy, an aluminum-nickel-bronze alloy, a bearing metal, and/or the like. Forward (along the X-axis) of the piston bearing 306 a dynamic seal 308 and a scraper 310 are fitted into the inner diameter of the gland body 300 annulus. The scraper 310 is proximate the rod end 302 of the gland body and the dynamic seal 308 lies proximally aft of the scraper 310. The dynamic seal 308 and the scraper 310 ride along the piston rod 210 surface and tend to inhibit fluid communication between the interior volume 216 of the cylinder 202 and the rod end 302. In this regard, the dynamic seal 308 of the gland 204 tends to inhibit fluid, for example, a hydraulic fluid from leaking about the piston rod 210.

In various embodiments, a supply port 312 extends radially from the outer diameter of the gland body 300 at the rod end 302. A supply port fitting 314 may be coupled to the supply port 312 and configured to interface the supply port 312 with a pressurized fluid source such as, for example, a hydraulic fluid line. In various embodiments, the pressurized fluid source may supply any suitable fluid known to those skilled in the art such as, for example, a liquid, a gas, an oil, and/or the like. The supply port fitting 314 may pass fluid from the fluid source though the supply port 312 into a toroidal cavity 318. The toroidal cavity 318 lies within the gland body 300 radially inward of the supply port 312 and is defined radially outward of the outer surface of the piston rod 210. In this regard, the toroidal cavity 318 may supply a portion of fluid to the surface of the piston rod 210 tending thereby to lubricate the piston bearing 306. A plurality of axial passages 320 may extend from the toroidal cavity 318 aft through the gland body 300 to exit at the piston end 304. Hydraulic fluid may flow from the toroidal cavity 318 through the axial passages 320 and apply hydraulic pressure between the piston 208 and the piston end 304 of the gland body 300. In response, the piston 208 may be driven relatively away from the piston end 304 to traverse axially into the interior volume 216 of the cylinder 202 and thereby withdrawn the piston rod 210 through the annulus of the gland body 300.

In various embodiments, a piston end flange 322 extends from the piston end 304 of the gland body 300. A static seal 324 is set against the outer diameter of the gland body 300 and pressed between the piston end flange 322 and a bearing flange 326. The hydraulic pressure driving the piston 208 may manifest as a reaction force Fs tending to drive the piston end 304 of gland 204 axially outward from the interior volume 216 of the cylinder 202. The reaction force Fs tends to be resisted by bearing flange 326 which transfers Fs through a lock ring retainer 328 and into a lock ring 330. The lock ring 330 engages with the cylinder sleeve 214. The cylinder sleeve 214 may comprise a thickened portion 332 having a lock ring channel 333 configured to engage with the lock ring 330 and to transfer the reaction force Fs into the cylinder 202. In this regard, the lock ring 330, the lock ring retainer 328, and bearing flange 326 tend to retain the gland 204 from translating (outward, along the X-axis) relative to the cylinder 202.

In various embodiments, the lock ring retainer 328 comprises a ring structure having a relatively L-shaped cross section. The lock ring retainer 328 may be segmented into two or more separable arcuate segments for assembly within the cylinder 202. In like regard, the lock ring 330 may similarly be segmented into two or more segments for assembly. Similarly, one or more arcuate spacers such as a first spacer 334 and a second spacer 336 may be inserted forward of the lock ring into the gap between the outer diameter of the gland and the sleeve 214. The spacers (334, 336) retain the lock ring 330 and lock ring retainer 328 axially with respect to the cylinder 202 and the gland 204 tending thereby to inhibit the lock ring retainer 328 and the lock ring 330 from translating (outward, along the X-axis) relative to the cylinder 202. In various embodiments, a spacer such as the first spacer 334 and the second spacer 336 may be fixed from translating with respect to the gland body 300 by a retention screw 338 and retention plate 340 which abut the supply port 312.

In various embodiments, the lock ring retainer 328 may comprise a second bearing material such as, for example, a nickel, a nickel alloy, a bronze, a bronze alloy, an aluminum alloy, an aluminum-nickel-bronze alloy, a bearing metal and/or the like. The lock ring 330 may comprise one of a steel, a stainless steel, and/or the like. In this regard, the lock ring retainer may comprise a static bearing (i.e., a second bearing) retaining the gland 204 with respect to the cylinder 202 tending thereby to inhibit shear failure and/or tear through of the gland body. In like regard, an endcap such as endcap 206 may be retained with respect to the cylinder 202 by a static bearing arrangement comprising a bearing flange, a lock ring retainer, a locking ring, and a spacer.

Figure 3C:
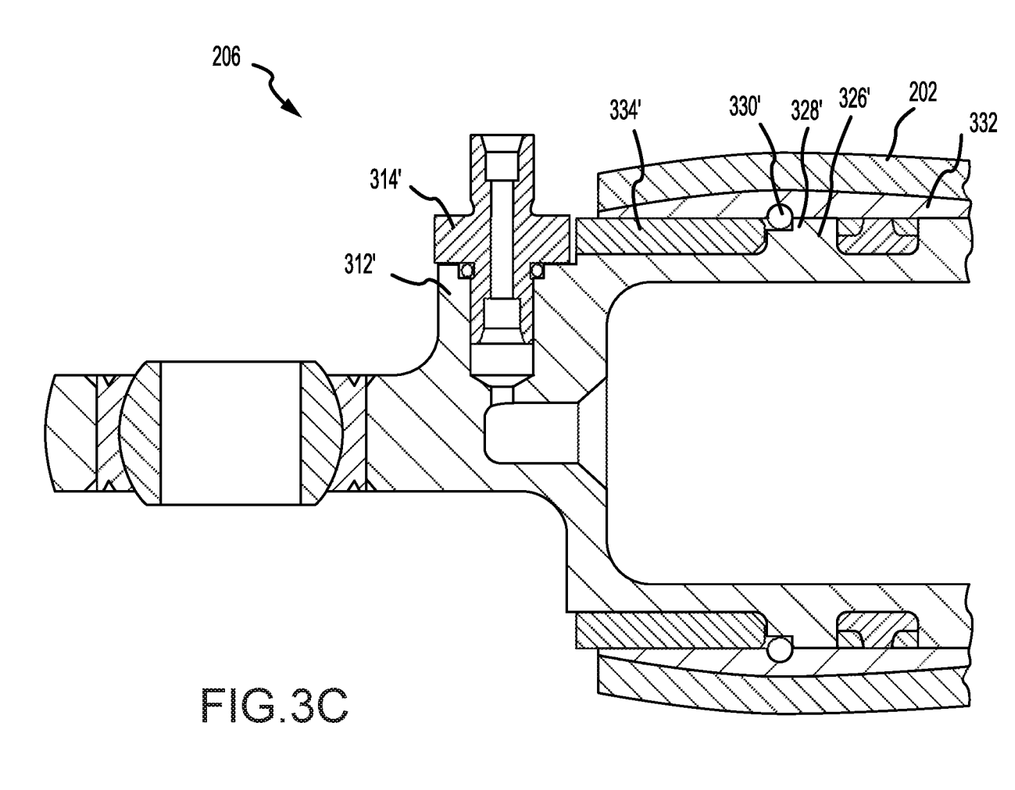
FIG. 3C illustrates an endcap of an actuator, in accordance with various embodiments.

In various embodiments as illustrated in FIG. 3C, endcap 206 may, in a like manner the gland 204, may be retained from translating (outward, along the X-axis) relative to the cylinder 202 by means of a lock ring 330' and bearing flange 326' which may comprise the lock ring retainer 328'. A spacer 334' may be fixed from translating axially with respect to a body 300' of endcap 206 by an interference between the spacer 334' and a supply port fitting 314' disposed within a supply port 312'.

Figure 4:
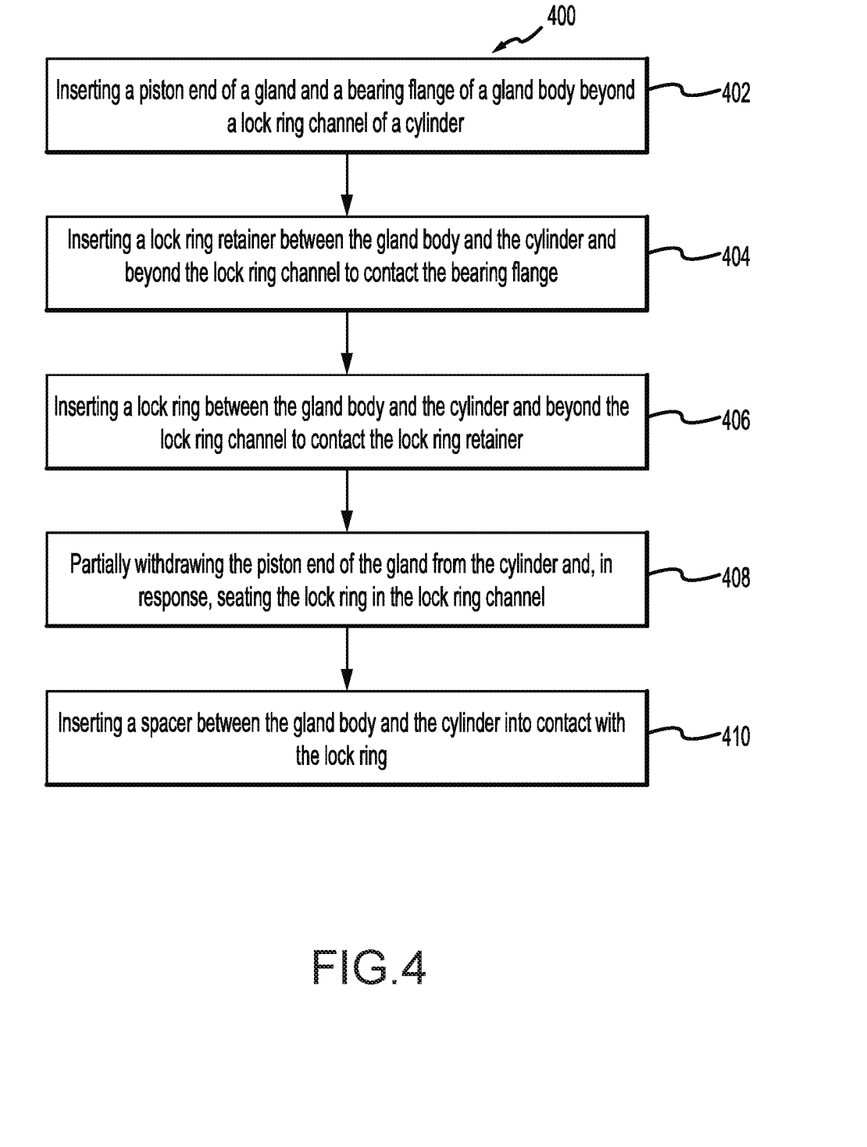
FIG. 4 illustrates a method of retaining a gland, in accordance with various embodiments.

In various embodiments and with reference to FIG. 4, a method 400 of retaining a gland to a cylinder may comprise inserting the piston end of the gland into the cylinder and further inserting a bearing flange of the gland body beyond a lock ring channel of the cylinder (step 402). Method 400 includes inserting a lock ring retainer between the gland body and the cylinder and beyond the lock ring channel to contact the bearing flange (step 404). Method 400 includes inserting a lock ring between the gland body and the cylinder and beyond the lock ring channel to contact the lock ring retainer (step 406). Method 400 includes partially withdrawing the piston end of the gland from the cylinder and, in response, seating the lock ring in the lock ring channel (step 408). Method 400 may include inserting a spacer between the gland body and the cylinder into contact with the lock ring (step 410). In various embodiments step 410 may include aligning the spacer with respect to the gland body. Step 410 may include fixing the spacer relative to the gland body.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A hydraulic actuator, comprising:
a cylinder closed at an end by a gland,
wherein the gland comprises a gland body having a bearing flange disposed within an interior volume of the cylinder;

a lock ring retainer disposed between the gland body and the cylinder and contacted with the bearing flange;

a lock ring coupled between the lock ring retainer and a lock ring channel of the cylinder; and a spacer disposed between the gland body and the cylinder, the spacer in contact with the lock ring.

2. The hydraulic actuator of claim 1, further comprising a piston disposed within the interior volume of the cylinder and coupled to a piston rod, wherein the gland body comprise an annular cylindrical structure, wherein the piston rod extends from a piston end of the gland body through an annulus of the gland body out a rod end of the gland body.

3. The hydraulic actuator of claim 2, wherein the piston rod is supported by a piston bearing fitted into the annulus of the gland body.

4. The hydraulic actuator of claim 3, wherein the gland body comprises one of aluminum, aluminum alloy, titanium, titanium alloy, lithium alloy, magnesium alloy, composite material, or plastic.

5. The hydraulic actuator of claim 1, wherein the cylinder comprises composite material.

6. The hydraulic actuator of claim 1, wherein the gland body further comprises a supply port, wherein the spacer is fixed from translating axially with respect to the gland body by an interference between the spacer and the supply port or between the spacer and a supply port fitting disposed within the supply port.

7. The hydraulic actuator of claim 1, wherein the lock ring retainer comprises one of nickel, nickel alloy, bronze, bronze alloy, aluminum, aluminum alloy, aluminum-nickel-bronze alloy, or bearing metal.

8. The hydraulic actuator of claim 1, wherein each of the lock ring, the lock ring retainer, and the spacer comprise two or more arcuate segments.

9. A landing gear system, comprising:

a shock strut coupled to an axle;

a wheel coupled to the axle; and a hydraulic actuator coupled to the shock strut comprising:

a cylinder closed at an end by a gland, wherein the gland comprises a gland body having a bearing flange disposed within an interior volume of the cylinder;

a lock ring retainer disposed between the gland body and the cylinder and contacted with the bearing flange;

a lock ring coupled between the lock ring retainer and a lock ring channel of the cylinder; and a spacer disposed between the gland body and the cylinder, the spacer in contact with the lock ring.

10. The landing gear system of claim 9, further comprising a piston disposed within the interior volume of the cylinder and coupled to a piston rod, wherein the gland body comprise an annular cylindrical structure, wherein the piston rod extends from a piston end of the gland body through an annulus of the gland body out a rod end of the gland body.

11. The landing gear system of claim 10, wherein the piston rod is supported by a piston bearing fitted into the annulus of the gland body.

12. The landing gear system of claim 11, wherein the gland body comprises one of aluminum, aluminum alloy, titanium, titanium alloy, lithium alloy, magnesium alloy, composite material, or plastic.

13. The landing gear system of claim 9, wherein the cylinder comprises composite material.

14. The landing gear system of claim 9, further comprising a spacer disposed between the gland body and the cylinder and contacted with the lock ring.

15. The landing gear system of claim 14, wherein the gland body further comprises a supply port, wherein the spacer is fixed from translating axially with respect to the gland body by an interference between the spacer and the supply port or between the spacer and a supply port fitting disposed within the supply port.

16. The landing gear system of claim 9, wherein the lock ring retainer comprises one of nickel, nickel alloy, bronze, bronze alloy, aluminum, aluminum alloy, aluminum-nickel-bronze alloy, or bearing metal.

17. The landing gear system of claim 14, wherein each of the lock ring, the lock ring retainer, and the spacer comprise two or more arcuate segments.

18. A method of retaining a gland, comprising:

inserting a piston end of a gland body of the gland into a cylinder and further inserting a bearing flange of the gland body beyond a lock ring channel of the cylinder;

inserting a lock ring retainer between the gland body and the cylinder and beyond the lock ring channel into contact with the bearing flange;

inserting a lock ring between the gland body and the cylinder and beyond the lock ring channel to contact the lock ring retainer;

partially withdrawing the piston end of the gland from the cylinder and, in response, seating the lock ring in the lock ring channel; and inserting a spacer disposed between the gland body and the cylinder into contact with the lock ring.

\* \* \* \* \*